United States Patent

Mevissen et al.

[11] Patent Number: 5,326,084
[45] Date of Patent: Jul. 5, 1994

[54] ONE PIECE BEARING UNIT SLEEVE FOR SUSPENSION MEMBER

[75] Inventors: Peter Mevissen, Weil der Stadt; Hans-Jürgen Wöhler, Stuttgart, both of Fed. Rep. of Germany

[73] Assignee: Dr. Ing. h.c.F. Porsche AG, Fed. Rep. of Germany

[21] Appl. No.: 5,262

[22] Filed: Jan. 19, 1993

[30] Foreign Application Priority Data

Jan. 24, 1992 [DE] Fed. Rep. of Germany ....... 4201837

[51] Int. Cl.⁵ ..................... B60G 15/07; B60G 21/055
[52] U.S. Cl. ...................................... 267/221; 267/34; 267/179; 280/697
[58] Field of Search .................. 267/220, 221–223, 267/179, 34, 286, 183, 190, 191; 188/322.19; 280/689, 697, 698, 700

[56] References Cited

U.S. PATENT DOCUMENTS

| 4,377,298 | 3/1983 | Finn et al. | 280/697 X |
| 4,475,725 | 10/1984 | Niemann | 267/286 |
| 4,962,834 | 10/1990 | Miner | 267/179 X |
| 4,997,201 | 3/1991 | Schaible | 267/34 X |
| 5,145,204 | 9/1992 | Perkins | 267/221 X |

FOREIGN PATENT DOCUMENTS

| 0279135 | 8/1988 | European Pat. Off. . |
| 0312711 | 4/1989 | European Pat. Off. . |
| 0370217 | 5/1990 | European Pat. Off. . |
| 79229304 | 3/1981 | Fed. Rep. of Germany . |
| 3514360 | 10/1986 | Fed. Rep. of Germany . |
| 3701265 | 7/1988 | Fed. Rep. of Germany . |
| 2472487 | 7/1981 | France . |
| 3145118 | 6/1988 | Japan ................................ 280/689 |
| 0570183 | 6/1945 | United Kingdom ............... 280/700 |

OTHER PUBLICATIONS

Reimpell, J. "Fahrwerktechnik:Grundlagen", 1988, Vogel, Würzburg, Germany.

*Primary Examiner*—Robert J. Oberleitner
*Assistant Examiner*—Josie A. Ballato

[57] ABSTRACT

A vibration damper for a wheel of a motor vehicle has a bearing unit for a suspension part of a stabilizer which is held on the spring strut. The bearing unit includes a holding element which extends around the cylinder of the spring strut and is connected with it. The holding element has a bearing for the suspension part in a projecting console and has a face that forms a spring plate. The face supports a coil spring which is arranged coaxially with respect to the spring strut. This coil spring is supported on the vehicle by an end which faces away from the bearing.

4 Claims, 3 Drawing Sheets

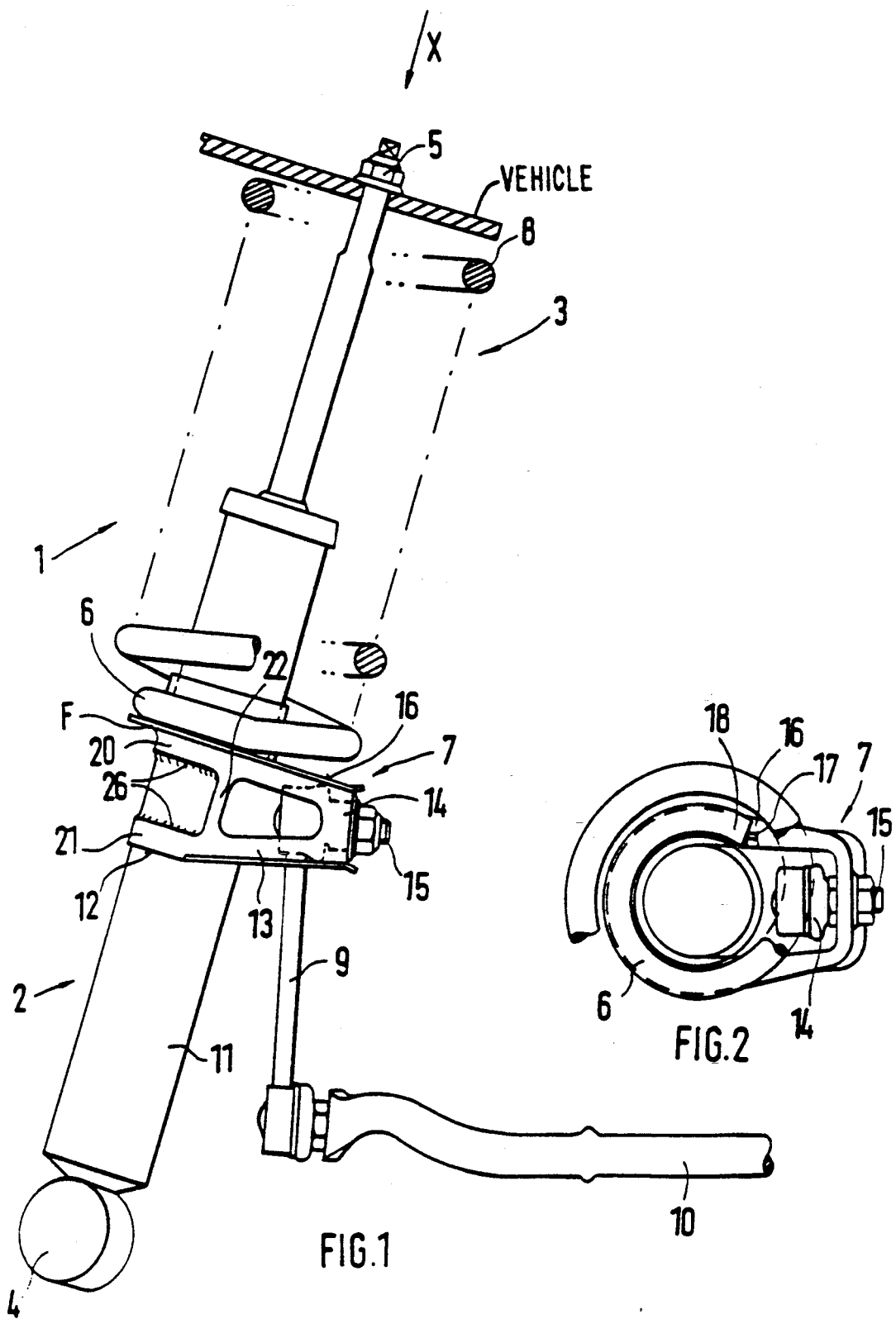

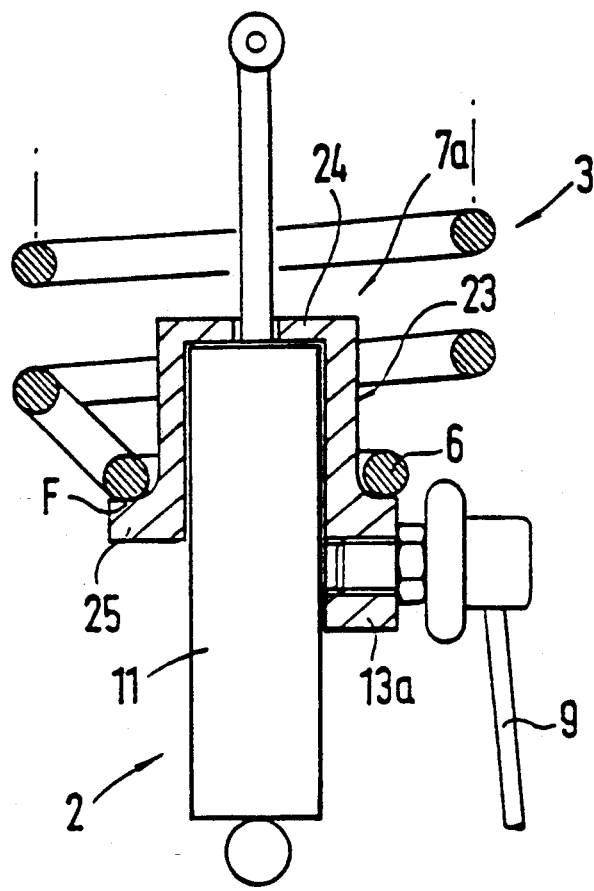

ONE PIECE BEARING UNIT SLEEVE FOR SUSPENSION MEMBER

BACKGROUND AND SUMMARY OF THE INVENTION

The present invention relates to a vibration damper for a wheel of a motor vehicle that has a bearing unit for a suspension part of a stabilizer which is held on the spring strut.

German Patent Document DE 37 01 265 C2 shows a vibration damper in which a suspension part of a stabilizer is pivotally connected to the spring strut by way of a connected console. A spring element arranged above the console is supported with its lower end in the direction of the strut by means of a spring plate fastened separately to the cylinder of the spring strut, the end which faces away being held on the vehicle by way of an elastic bearing.

An object of the invention is to provide a vibration damper by which a constructionally simplified bearing for the suspension part and the coil spring is ensured.

This and other objects are achieved by the present invention which provides a vibration damper for a wheel of a motor vehicle, the vibration damper comprising a coil spring and a bearing unit for a suspension part of a stabilizer which is held on a spring strut. The bearing unit comprises a holding element which extends around the cylinder of the spring strut and is connected with the cylinder. The holding element has a projecting console with a bearing for the suspension part and a face forming a spring plate for the coil spring which is coaxial with respect to the spring struts. The coil springs are supported on the vehicle at an end facing away from the bearing.

The principal advantages achieved by means of the invention are that the bearing for the suspension part and for the coil spring on the spring strut may be combined by means of one component. As a result, a component can be saved in comparison to the state of the art and a separate fastening is not required for the now no longer existing spring plate. This leads to a reduction in weight.

The bearing unit on the spring strut has a holding element which reaches around the spring strut and comprises a sleeve part with a molded-on console for a bearing of the suspension part. A spring plate for the coil spring is constructed on the top side of the sleeve part.

By means of this arrangement of the integrated spring plate, the spring cannot slide off, as in the state of the art, in the case of a breakage of the spring.

In the supporting surface formed by the spring plate, a limit stop for the end of the last winding of the coil spring is provided which consists of a tongue pressed out of the material of the supporting surface.

In a first embodiment, the sleeve part includes two spaced sleeve rings which have an axial recess between one another. Both sleeve rings are connected with the console in such a manner that one component is created with respect to stability. For the fixing, the rings are welded to the cylinder.

According to another embodiment of the invention, it is a disadvantage in the case of a level-controlled spring strut to connect the holding element with the cylinder of the spring strut by means of welding. The holding element will then consist of a pot-shaped component which is slid onto the cylinder of the spring strut and is supported by means of its bottom on the face side of the cylinder.

On the edge of this pot-shaped holding element, a flange is provided which is constructed as a spring plate. On one side, the flange is provided with a console for the bearing of the suspension part. The connecting of the pot-shaped element with the cylinder of the spring strut may take place by gluing, pressing or a similar method.

For the level compensation, the damper is connected with a spring accumulator which can be acted upon by pressure by way of a pump.

Other objects, advantages and novel features of the present invention will become apparent from the following detailed description of the invention when considered in conjunction with the accompanying drawings.

BRIEF DESCRIPTION OF THE DRAWINGS

FIG. 1 is a view of a vibration damper constructed in accordance with an embodiment of the present invention with a bearing unit for the suspension part and a coil spring.

FIG. 2 is a view of the bearing unit in the direction of the arrow X of FIG. 1.

FIG. 6 is a view of another embodiment of a bearing unit.

DETAILED DESCRIPTION OF THE DRAWINGS

Figure 3:
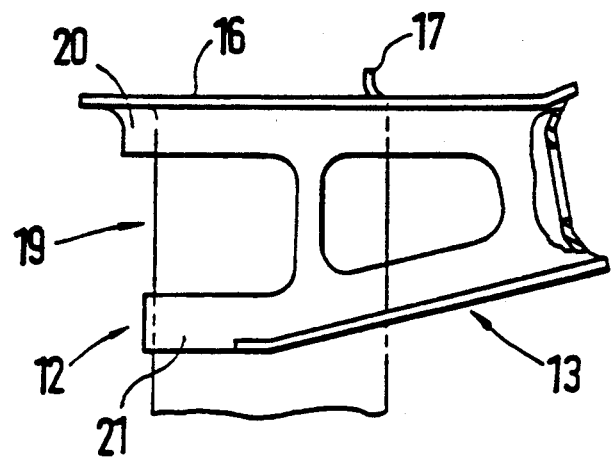
FIG. 3 is a frontal view of the bearing unit.
Figure 4:
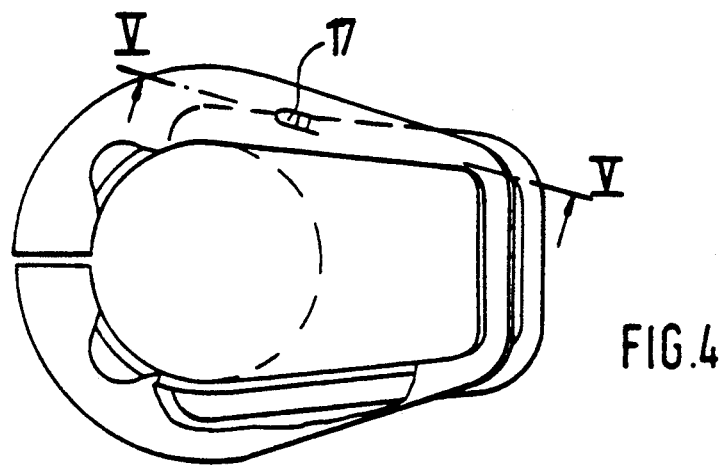
FIG. 4 is a top view of the bearing unit.
Figure 5:
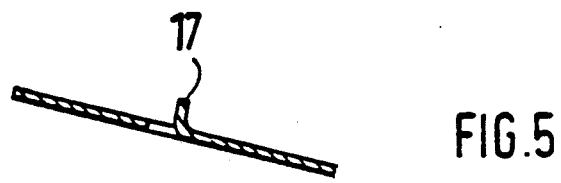
FIG. 5 is a sectional view of a stop of the line V—V of FIG. 4.

A vibration damper 1 comprises a spring strut 2 as well as a coil spring 3. The spring strut 2 may, for example, by means of its lower end 4, be supported on a suspension link or on a wheel carrier (not shown), and by means of its upper end 5 may be supported on the vehicle body. With its lower end or with the last winding 6, the coil spring 3 is supported on a bearing unit 7, 7a, and with its upper end 8, which faces away, it is supported on the vehicle body. A suspension part 9 of a stabilizer 10 is connected with the bearing unit 7, 7a.

The bearing unit 7 comprises a holding element 22 which reaches around the cylinder 11 of the spring strut 2. This holding element 22 has a sleeve part 12 which is followed by a molded-on console 13 which projects away from the cylinder 11 and, on the end side, has a bearing 14 with a fastening 15 for an end of the suspension part 9.

A flat face 16 (FIGS. 2 and 3) formed by the sleeve part 12 and the console 13 forms the spring plate F for the coil spring 3 which is supported on it by means of its last winding 6. In the area 16, a limit stop 17 is provided which holds the free end 18 of the last winding 6 in a defined position.

The sleeve part 12 comprises sleeve rings 20 and 21 which are spaced by means of an axial recess 19 and, with respect to stability, are connected to the console 13. These sleeve rings 20 and 21 are fixedly connected with the cylinder 11 of the spring strut 2 by means of a welding 26.

According to another embodiment of FIG. 6, the bearing unit 7a has a pot-shaped holding element 23 which is arranged on the cylinder 11 in a slid-over manner and is supported by way of its bottom 24 on the face side of the cylinder 11. On the edge of the pot-shaped holding element, a flange is constructed which is used as a spring plate F for the spring 3. On the flange 25, a console 13a is arranged on one side and receives the bearing 14 for the suspension part 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vibration damper for a wheel of a motor vehicle, comprising:
   a coil spring; and
   a bearing unit for a suspension part of a stabilizer which is held on a spring strut, wherein the bearing unit comprises a holding element which has a sleeve part that extends around a cylinder of the spring strut and is connected with the cylinder, the holding element also having a projecting console constructed in one piece with the sleeve part and providing a bearing for the suspension part, and a face constructed in one piece with the sleeve part and the console, the face forming a spring plate for the coil spring which is coaxial with respect to the spring strut, the coil spring being supported on the vehicle at an end facing away from the bearing, wherein the face of the spring plate includes a limit stop for a last winding of the coil spring.

2. A vibration damper according to claim 1, wherein the sleeve part encloses the spring strut, the console branching away from the sleeve part and in which an end of the suspension part is fixed in the bearing unit.

3. A vibration damper according to claim 1, wherein the sleeve part has an axial recess and is formed by two spaced sleeve rings which are connected to the console.

4. A vibration damper according to claim 3, wherein the sleeve rings are each connected by a welding to the cylinder of the spring strut.

* * * * *